United States Patent
Heguri et al.

(10) Patent No.: US 9,605,094 B2
(45) Date of Patent: Mar. 28, 2017

(54) METHOD FOR PRODUCING WATER ABSORBENT RESIN PARTICLES

(71) Applicant: SUMITOMO SEIKA CHEMICALS CO., LTD., Harima-cho, Kako-gun, Hyogo (JP)

(72) Inventors: Atsushi Heguri, Osaka (JP); Kenji Tanimura, Himeji (JP); Yuichi Onoda, Himeji (JP); Masayoshi Handa, Himeji (JP)

(73) Assignee: Sumitomo Seika Chemicals Co., Ltd., Hyogo (JP)

(*) Notice: Subject to any disclaimer, the term of this patent is extended or adjusted under 35 U.S.C. 154(b) by 0 days.

(21) Appl. No.: 14/349,235

(22) PCT Filed: Sep. 24, 2012

(86) PCT No.: PCT/JP2012/074432
§ 371 (c)(1),
(2) Date: Apr. 2, 2014

(87) PCT Pub. No.: WO2012/051417
PCT Pub. Date: Apr. 11, 2013

(65) Prior Publication Data
US 2014/0243478 A1 Aug. 28, 2014

(30) Foreign Application Priority Data
Oct. 6, 2011 (JP) .................... 2011-221899

(51) Int. Cl.
C08F 120/06 (2006.01)
C08F 265/02 (2006.01)
C08F 20/06 (2006.01)
C08F 2/32 (2006.01)

(52) U.S. Cl.
CPC ............. C08F 120/06 (2013.01); C08F 2/32 (2013.01); C08F 20/06 (2013.01); C08F 265/02 (2013.01)

(58) Field of Classification Search
CPC .......... C08F 2/32; C08F 20/06; C08F 120/06; C08F 265/02
See application file for complete search history.

(56) References Cited

U.S. PATENT DOCUMENTS 4,777,231 A * 10/1988 Bailey et al. ................ 526/203
5,314,952 A    5/1994 Choi et al.

FOREIGN PATENT DOCUMENTS

| CN | 101835809 | 9/2010 |
| EP | 0522570 B1 * | 4/1997 |
| EP | 1 291 368 | 3/2003 |
| EP | 2 631 251 | 8/2013 |
| JP | 56-131608 | 10/1981 |
| JP | 3-195709 | 8/1991 |
| JP | 3-227301 | 10/1991 |
| JP | 4-501877 | 4/1992 |
| JP | 9-151224 | 6/1997 |
| JP | 11-335404 | 12/1999 |
| JP | 2002-105125 | 4/2002 |
| JP | 2005-126474 | 5/2005 |
| JP | 2006-089525 | 4/2006 |
| WO | 97/03114 | 1/1997 |
| WO | 2009/025235 | 2/2009 |
| WO | 2012/014748 | 2/2012 |
| WO | 2013/018571 | 7/2013 |

OTHER PUBLICATIONS

Ryoto Sugar Ester (Food grade) product information sheet available online at http://www.mfc.co.jp/english/seihin.htm on Apr. 14, 2015.*
Machine translation of JP2006-089525 downloaded Apr. 14, 2015.*
Extended European Search Report issued in counterpart European Patent Application No. 12837712.4, Apr. 29, 2015, 6 pages.
Office Action issued in counterpart Japanese Application No. 2013-537469, Mar. 15, 2016, 4 pages.

* cited by examiner

*Primary Examiner* — Irina S Zemel
*Assistant Examiner* — Jeffrey Lenihan
(74) *Attorney, Agent, or Firm* — Hamre, Schumann, Mueller & Larson, P.C.

(57) ABSTRACT

There is disclosed a method for producing water-absorbent resin particles, comprising a polymerization step that includes mixing an oily liquid comprising a hydrocarbon dispersing medium and a surfactant, and an aqueous liquid comprising an aqueous solvent and a water-soluble ethylenically unsaturated monomer, forming a suspension comprising an oily liquid and an aqueous liquid dispersed in the oily liquid, and polymerizing the water-soluble ethylenically unsaturated monomer in the suspension. The HLB of the surfactant is 6 or greater, and the temperature of the suspension is kept at 35° C. or higher during the period from initial mixing of the oily liquid and aqueous liquid until complete mixing of the entire amounts.

5 Claims, No Drawings

METHOD FOR PRODUCING WATER ABSORBENT RESIN PARTICLES

TECHNICAL FIELD

The present invention relates to a method for producing water-absorbent resin particles.

BACKGROUND ART

Water-absorbent resin particles have been used for hygienic materials such as disposable diapers and sanitary articles, for agricultural and gardening materials such as water-retaining materials and soil conditioners, and for industrial materials such as water blocking materials for cables, and dew-catchers. In recent years, in addition to these materials, water-absorbent resin particles are being applied in an even wider range of fields including animal excreta treatment materials such as pet sheets and dog or cat toilet blending materials, portable toilets, aromatic agents, meat drip absorbing sheets, moisturizing cosmetic formulations, and the like. The performance that is demanded for water-absorbent resin particles to be used for such purposes includes high water-absorption capacity, excellent water-absorption rate and particle size suited for the purpose.

Among these, water-absorbent resins used for purposes such as special hygiene materials such as adult diapers, incontinence pads, toilet-training pants and extra-high-absorbent napkins, water blocking materials for cables, pet sheets, portable toilets and the like, are assumed to be subjected to forceful excretion of relatively large amounts of body fluids. For such purposes, particular attention has been directed toward improving absorption capacity (water-absorption capacity) and water-absorption rate. Absorption capacity can be adjusted by the amount of water-absorbent resin particles used, but water-absorption rate is usually based on the characteristic properties of the water-absorbent resin particles. Much research has therefore been carried out in the past with the aim of achieving excellent water-absorption rates for water-absorbent resin particles.

For example, there is disclosed a method of aqueous liquid polymerization in which a porous resin obtained in the presence of a foaming agent is crosslinked near the surface (see Patent document 1).

There are also disclosed, a reversed-phase suspension polymerization method wherein an acrylic acid/acrylic acid salt aqueous liquid is suspended in an alicyclic or aliphatic hydrocarbon solvent in the presence of an HLB 8-12 surfactant, and the acrylic acid/acrylic acid salt is subjected to reversed-phase suspension polymerization (see Patent document 2), and a method of polymerizing a water-soluble ethylenically unsaturated monomer in the presence of water-absorbent resins with different water-absorption rates (see Patent document 3).

CITATION LIST

Patent Literature

[Patent document 1] International Patent Publication No. WO97/003114
[Patent document 2] Japanese Unexamined Patent Application Publication SHO No. 56-131608
[Patent document 3] Japanese Unexamined Patent Application Publication HEI No. 9-151224

SUMMARY OF INVENTION

Technical Problem

Methods of reducing the particle size of water-absorbent resin particles are also commonly employed as methods for improving the absorption rates of water-absorbent resin particles. However, reducing the particle size of water-absorbent resin particles tends to impair their flowability and interfere with their handling as particles. A demand therefore exists for a method of improving the water-absorption rate of water-absorbent resin particles that still have suitable particle size.

Based on research by the present inventors, it has been found that the water-absorbent resin particles disclosed in Patent document 1 have not been satisfactory in terms of both particle size and water-absorption rate performance. Research by the present inventors has also shown that, although the water-absorbent resin particles disclosed in Patent documents 2 and 3 have relatively large particle size and excellent handling ease and water-absorption rate, the hydrocarbon dispersing medium used during production remains as a volatile component inside the resin, and can generate odor after water absorption, for example, the odor during use of the product potentially impairing the comfort of the user (i.e. the wearer). In consideration of the production process environment and from the viewpoint of improving the water absorption performance as well, a low residual volatile component content is desired.

It is therefore an object of the invention to provide a method for producing water-absorbent resin particles with excellent handling ease, excellent water-absorption rate, and low residual volatile component content.

Solution to Problem

The present invention relates to a method for producing water-absorbent resin particles, comprising a polymerization step that includes mixing an oily liquid comprising a hydrocarbon dispersing medium and a surfactant, and an aqueous liquid comprising an aqueous solvent and a water-soluble ethylenically unsaturated monomer, forming a suspension comprising the oily liquid and the aqueous liquid dispersed in the oily liquid, and polymerizing the water-soluble ethylenically unsaturated monomer in the suspension.

The present invention further relates to a method for producing water-absorbent resin particles comprising, in order, a first polymerization step that includes mixing an oily liquid comprising a hydrocarbon dispersing medium and a surfactant, and an aqueous liquid comprising an aqueous solvent and a water-soluble ethylenically unsaturated monomer, forming a suspension comprising the oily liquid and the aqueous liquid dispersed in the oily liquid, and polymerizing the water-soluble ethylenically unsaturated monomer in the suspension to obtain a suspension comprising a water-containing gelated polymer, and a second polymerization step that includes mixing the suspension at 45° C. or higher comprising the water-containing gelated polymer, with a second aqueous liquid comprising an aqueous solvent and a water-soluble ethylenically unsaturated monomer, and polymerizing the water-soluble ethylenically unsaturated monomer in the suspension in which the second aqueous liquid has been dispersed.

The HLB of the surfactant is 6 or greater. In the (first) polymerization step, during the period from initial mixing of the oily liquid and aqueous liquid until complete mixing of the entire amounts, the temperature of the formed suspension is kept at 35° C. or higher.

According to this production method, it is possible to obtain water-absorbent resin particles with excellent handling ease, excellent water-absorption rate, and low residual volatile component content.

The temperature of the oily liquid to be mixed with the aqueous liquid may be 50° C. or higher.

The surfactant may comprise one or more compounds selected from the group consisting of sorbitan fatty acid esters, polyglycerin fatty acid esters and sucrose fatty acid esters.

A suspension comprising such specific surfactants will result in a more satisfactory state of the W/O reversed-phase suspension formed by the oily liquid (O) as a continuous phase and the aqueous liquid (W) as a discontinuous phase, and will tend to more easily produce water-absorbent resin particles with the desired shape and the desired particle size.

The water-soluble ethylenically unsaturated monomer may comprise one or more compounds selected from the group consisting of acrylic acid and its salts, methacrylic acid and its salts, and acrylamide.

The hydrocarbon dispersing medium may comprise one or more dispersing media selected from the group consisting of C6-8 aliphatic hydrocarbons and C6-8 alicyclic hydrocarbons.

Advantageous Effects of Invention

The water-absorbent resin particles obtained by the production method of the present invention have excellent water-absorption rate. In addition, since the water-absorbent resin particles obtained by the production method of the invention have suitably large particle size, the particles have excellent handling ease and low residual volatile component content, thereby allowing problems such as odor after water absorption to be reduced.

DESCRIPTION OF EMBODIMENTS

Preferred embodiments of the invention will now be described in detail. However, the present invention is not limited to the embodiments described below. All of components described in the present specification may be employed in desired combinations, such as are within the scope of the gist of the invention. For example, the numerical ranges for each property may be defined using the upper limits and lower limits for the numerical ranges described in the present specification, or any desired numerical values selected among the numerical values listed in the examples, as upper limits or lower limits.

The method for producing water-absorbent resin particles according to this embodiment comprises a polymerization step that includes mixing an oily liquid comprising a hydrocarbon dispersing medium and a surfactant, and an aqueous liquid comprising an aqueous solvent and a water-soluble ethylenically unsaturated monomer, forming a suspension comprising the oily liquid and the aqueous liquid dispersed in the oily liquid, and polymerizing the water-soluble ethylenically unsaturated monomer in the suspension, to obtain a suspension containing the water-containing gelated polymer. The HLB of the surfactant is 6 or greater, and during the period from initial mixing of the oily liquid and aqueous liquid until complete mixing of the entire amounts, the temperature of the formed suspension is kept at 35° C. or higher. In the explanation which follows, this polymerization step may be referred to as "the first polymerization step", and this aqueous liquid may be referred to as "the first aqueous liquid".

The first aqueous liquid comprises an aqueous solvent containing water, a water-soluble ethylenically unsaturated monomer, a radical polymerization initiator, and optionally various additives. The aqueous solvent is composed mainly of water, and it may also contain other hydrophilic solvents.

Water-soluble ethylenically unsaturated monomers include ethylenically unsaturated monomers containing one or more functional groups selected from the group consisting of carboxyl, sulfo, amide and amino groups. Examples of water-soluble ethylenically unsaturated monomers include (meth)acrylic acid (hereunder, "acrylic" and "methacrylic" will be collectively referred to as "(meth)acrylic") and its alkaline salts, 2-(meth)acrylamide-2-methylpropanesulfonic acid and its alkaline salts, (meth)acrylamide, N,N-dimethyl (meth)acrylamide, 2-hydroxyethyl (meth)acrylate, N-methylol (meth)acrylamide, polyethylene glycol mono (meth)acrylate, N,N-diethylaminoethyl (meth)acrylate, N,N-diethylaminopropyl (meth)acrylate and diethylaminopropyl (meth)acrylamide. When the water-soluble ethylenically unsaturated monomer contains an amino group, the amino group may be quaternized. The functional group, such as carboxyl or amino group, of the monomer can function as a functional group allowing crosslinking during the post-crosslinking step described below. Such water-soluble ethylenically unsaturated monomers may be used alone or in combinations of two or more.

From the viewpoint of industrial availability, the water-soluble ethylenically unsaturated monomer may include, among the compounds mentioned above, one or more compounds selected from the group consisting of acrylic acid and its alkaline salts, methacrylic acid and its alkaline salts, acrylamide, methacrylamide and N,N-dimethylacrylamide, or one or more compounds selected from the group consisting of acrylic acid and its alkaline salts, methacrylic acid and its alkaline salts, and acrylamide. From the viewpoint of further increasing safety, the water-soluble ethylenically unsaturated monomer may include one or more compounds selected from the group consisting of acrylic acid and its alkaline salts, and methacrylic acid and its alkaline salts.

The water-soluble ethylenically unsaturated monomer may be dissolved in water to prepare a water-soluble ethylenically unsaturated monomer aqueous liquid, and the aqueous liquid used as the first aqueous liquid. The concentration of the water-soluble ethylenically unsaturated monomer in the aqueous liquid may be in the range of 20 wt % to saturation. Also, from the viewpoint of obtaining a satisfactory state of the W/O reversed-phase suspension and suitable particle size, and improving the swelling performance of the obtained water-absorbent resin particles, the concentration of the water-soluble ethylenically unsaturated monomer may be 25-50 wt %, 30-45 wt % or 35-42 wt %.

When the water-soluble ethylenically unsaturated monomer has an acid group such as (meth)acrylic acid or 2-(meth)acrylamide-2-methylpropanesulfonic acid, the acid group may be neutralized with an alkaline neutralizer such as an alkali metal salt, to form an alkaline salt. The alkaline neutralizer may be an aqueous liquid of sodium hydroxide, potassium hydroxide or ammonia, for example. These alkaline neutralizers may each be used alone, or two or more may be used in combination.

The degree of neutralization with the alkaline neutralizer with respect to the entire acid may be in the range of 10-100 mol %, in the range of 30-90 mol %, in the range of 50-80 mol % or in the range of 60-78 mol %, from the viewpoint of increasing the osmotic pressure of the obtained water-absorbent resin particles to improve the swelling performance, and suppressing residue of excess alkaline neutralizer so as to help avoid safety and other problems.

The first aqueous liquid may include a radical polymerization initiator. The radical polymerization initiator may be water-soluble. Examples of radical polymerization initiators include persulfuric acid salts such as potassium persulfate, ammonium persulfate and sodium persulfate; peroxides such as methyl ethyl ketone peroxide, methyl isobutyl ketone peroxide, di-t-butyl peroxide, t-butylcumyl peroxide, t-butyl peroxyacetate, t-butyl peroxyisobutyrate, t-butyl peroxypivalate and hydrogen peroxide; and azo compounds such as 2,2'-azobis(2-methylpropionamidine) dihydrochloride, 2,2'-azobis[2-(N-phenylamidino)propane] dihydrochloride, 2,2'-azobis[2-(N-allylamidino)propane] dihydrochloride, 2,2'-azobis{2-[1-(2-hydroxyethyl)-2-imidazolin-2-yl]propane} dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide] and 4,4'-azobis(4-cyanovaleric acid). These radical polymerization initiators may each be used alone, or two or more may be used in combination.

The amount of radical polymerization initiator used will usually be 0.005-1 mol with respect to 100 mol of the water-soluble ethylenically unsaturated monomer. Using the radical polymerization initiator in an amount of at least 0.005 mol is efficient as this will eliminate the need for a long time for polymerization reaction. An amount of no greater than 1 mol will tend to prevent abrupt polymerization reaction.

The radical polymerization initiator may be used in combination with a reducing agent such as sodium sulfite, sodium hydrogen sulfite, ferrous sulfate or L-ascorbic acid, for use as a redox polymerization initiator.

The first aqueous liquid may also comprise a chain transfer agent to control the water absorption performance of the water-absorbent resin particles. Examples of such a chain transfer agent include hypophosphorous acid salts, thiols, thiolic acids, secondary alcohols and amines.

The first aqueous liquid may also comprise a water-soluble thickener. Examples of water-soluble thickeners include hydroxyalkyl celluloses such as hydroxyethyl cellulose (HEC) and hydroxypropyl cellulose (HPC); hydroxyalkylalkyl celluloses such as hydroxyethylmethyl cellulose, hydroxypropylmethyl cellulose and hydroxyethylethyl cellulose; carboxyalkyl celluloses such as carboxymethyl cellulose; and carboxyalkylhydroxyalkyl celluloses such as carboxymethylhydroxyethyl cellulose. Among these, there may be included as water-soluble thickeners one or more compounds selected from among hydroxyalkyl cellulose, hydroxyalkylalkyl cellulose and carboxyalkylhydroxyalkyl cellulose, or hydroxyethyl cellulose and hydroxypropyl cellulose. Hydroxyethyl cellulose and hydroxypropyl cellulose have high solubility in aqueous liquids, more readily exhibit a thickening effect for aqueous liquids, and allow the residual volatile component content of the water-absorbent resin particles to be further reduced.

The first aqueous liquid may also comprise a hydrophilic polymer dispersing agent. Examples of hydrophilic polymer dispersing agents include polyvinyl alcohol (PVA), polyvinylpyrrolidone (PVP), polyethylene glycol (PEG), polypropylene glycol, polyethylene glycol/polypropylene glycol block copolymer, polyglycerin, polyoxyethylene glycerin, polyoxypropylene glycerin, polyoxyethylene/polyoxypropylene glycerin copolymer and polyoxyethylene sorbitan fatty acid esters. Among these there may be included in the hydrophilic polymer dispersing agent one or more compounds selected from the group consisting of polyvinyl alcohol, polyvinylpyrrolidone, polyethylene glycol, polypropylene glycol and polyglycerin. From the viewpoint of reducing the residual volatile component content, the hydrophilic polymer dispersing agent may include polyvinylpyrrolidone or polyvinyl alcohol. These hydrophilic polymer dispersing agents may each be used alone, or two or more may be used in combination.

The oily liquid comprises mainly a hydrophobic liquid composed of a hydrocarbon dispersing medium, and a surfactant. For reversed-phase suspension polymerization, the hydrocarbon dispersing medium may be used as the aqueous liquid dispersing medium.

The HLB of the surfactant may be 6 to 16. The HLB of the surfactant may also be 7 to 16, 8 to 12, or 8.5 to 10.5. If the HLB of the surfactant is within this range, the condition of the W/O reversed-phase suspension will be more satisfactory, and the obtained particles will tend to have more suitable particle size and a superior water-absorption rate.

Examples of surfactants include nonionic surfactants such as sorbitan fatty acid esters, (poly)glycerin fatty acid esters (where "(poly)" means the compound with and without the prefix "poly", same hereunder), sucrose fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkylallylformaldehyde-condensed polyoxyethylene ethers, polyoxyethylene/polyoxypropylene block copolymer, polyoxyethylene/polyoxypropylalkyl ethers, and polyethylene glycol fatty acid esters; and anionic surfactants such as fatty acid salts, alkylbenzenesulfonic acid salts, alkylmethyltaurine acid salts, polyoxyethylene alkyl phenyl ether sulfates, polyoxyethylene alkyl ether sulfonates, polyoxyethylene alkyl ether phosphates, and polyoxyethylene alkyl allyl ether phosphates. Among these, the surfactant may include one or more compounds selected from the group consisting of sorbitan fatty acid esters, polyglycerin fatty acid esters and sucrose fatty acid esters, from the viewpoint of a satisfactory state of the W/O reversed-phase suspension, more easily obtaining suitable size for the water-absorbent resin particles, and industrial availability. From the viewpoint of improved performance of the obtained water-absorbent resin particles, the surfactant may include a sorbitan fatty acid ester. These surfactants may each be used alone, or two or more may be used in combination.

From the viewpoint of stabilizing the state of the W/O reversed-phase suspension, and using an efficient amount for a suspension-stabilizing effect, the amount of surfactant used may be 0.1-5 parts by weight, 0.2-3 parts by weight or 0.4-2 parts by weight with respect to 100 parts by weight as the total of the aqueous solvent, the water-soluble ethylenically unsaturated monomer, the radical polymerization initiator and additives such as the chain transfer agent.

In order to stabilize the state of the W/O reversed-phase suspension, the oily liquid may include a hydrophobic polymer dispersing agent. By using a surfactant and a hydrophobic polymer dispersing agent in combination, it is possible to further stabilize the state of the W/O reversed-phase suspension. Examples of hydrophobic polymer dispersing agents include maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethylcellulose and ethylhydroxyethyl cellulose. Among these, from the viewpoint of stability of the W/O reversed-phase suspension, the hydrophobic polymer dispersing agent may include one or more selected from the group consisting of maleic anhydride-modified polyethylene, maleic anhydride-modified polypropylene, maleic anhydride-modified ethylene-propylene copolymer, oxidized polyethylene and ethylene-acrylic acid copolymer. These hydrophobic polymer dispersing agents may each be used alone, or two or more may be used in combination.

The amount of hydrophobic polymer dispersing agent used may be 0.1-5 parts by weight, 0.2-3 parts by weight or 0.4-2 parts by weight with respect to 100 parts by weight as the total of the aqueous solvent, the water-soluble ethylenically unsaturated monomer, the radical polymerization initiator and additives.

Examples of hydrocarbon dispersing media include chain aliphatic hydrocarbons such as n-hexane, n-heptane, 2-methylhexane, 3-methylhexane, 2,3-dimethylpentane, 3-ethylpentane and n-octane; alicyclic hydrocarbons such as cyclohexane, methylcyclohexane, cyclopentane, methylcyclopentane, trans-1,2-dimethylcyclopentane, cis-1,3-dimethylcyclopentane and trans-1,3-dimethylcyclopentane; and aromatic hydrocarbons such as benzene, toluene and xylene. These hydrocarbon dispersing media may each be used alone, or two or more may be used in combination. The hydrocarbon dispersing media may include one or more compounds selected from the group consisting of C6-8 chain aliphatic hydrocarbons and C6-8 alicyclic hydrocarbons. From the viewpoint of a satisfactory state of the W/O reversed-phase suspension, easily obtaining a suitable particle size of the water-absorbent resin particle for excellent water-absorption rate, industrial availability, and stabilized quality, the hydrocarbon dispersing medium may include n-heptane, cyclohexane, or both. From the same viewpoint, a mixture of hydrocarbon dispersing media may be used, such as the commercially available product EXXSOL heptane (containing 75-85% n-heptane and isomeric hydrocarbons, product of ExxonMobil).

From the viewpoint of removing sufficient polymerization heat and facilitating control of the polymerization temperature, the amount of hydrocarbon dispersing medium used may be 50-650 parts by weight, 70-550 parts by weight or 100-450 parts by weight, with respect to 100 parts by weight of the water-soluble ethylenically unsaturated monomer in the first aqueous liquid. If the amount of hydrocarbon dispersing medium used is at least 50 parts by weight, it will tend to be easier to control the polymerization temperature. If the amount of hydrocarbon dispersing medium used is no greater than 650 parts by weight, the polymerization productivity will tend to be improved, and economy will increase.

One feature of the production method of this embodiment is that in a polymerization step in which a water-soluble ethylenically unsaturated monomer is subjected to reversed-phase suspension polymerization in a hydrocarbon dispersing medium in the presence of a surfactant with an HLB of 6 or greater, the temperature is specified for forming the suspension of the aqueous liquid of the water-soluble ethylenically unsaturated monomer dispersed in the hydrocarbon dispersing medium.

The temperature of the oily liquid before admixture with the first aqueous liquid may be 50° C. or higher, 50° C. to 110° C., 55° C. to 100° C., 60° C. to 90° C. or 65° C. to 85° C. By adjusting the oily liquid to this temperature range before mixing, it is possible to easily maintain the temperature of the suspension to a temperature of 35° C. or higher during the period from initial mixing of the oily liquid with the first aqueous liquid, until complete mixing of the entire amounts. The temperature of the first aqueous liquid before admixture with the oily liquid will usually be about 5° C. to 30° C.

If the temperatures of the oily liquid and the first aqueous liquid before mixing are adjusted so that the temperature of the suspension is 35° C. or higher at the point at which mixing of the oily liquid and the first aqueous liquid has been completed (hereunder also referred to as "upon suspension"), the temperature of the suspension will generally remain at 35° C. or higher from the time of initial mixture of the oily liquid with the first aqueous liquid until complete mixture of their entire amounts. The temperature of the suspension may be kept at 35° C. or higher, or at any of the temperatures specified below, during the period from complete mixing of the entire amounts of the oily liquid and the first aqueous liquid, until the suspension is heated for polymerization of the water-soluble ethylenically unsaturated monomer.

The temperature of the suspension upon suspension of the first aqueous liquid may be 35° C. to 100° C., 40° C. to 90° C., 45° C. to 80° C. or 50° C. to 75° C. By limiting the temperature upon suspension to this range, it is possible to efficiently reduce the residual volatile component content.

While not every aspect is known regarding the mechanism by which the residual volatile component content are reduced by specifying the temperature upon suspension, it is believed that increasing the temperature of the suspended mixture (suspension), for example, further activates the suspended state and makes monomer droplets in the W/O reversed-phase suspension smaller, and inhibits formation of O/W/O moieties in which the hydrocarbon dispersing medium is enclosed in the monomer droplets.

The polymerization temperature during reversed-phase suspension polymerization (the suspension temperature) will differ depending on the type of water-soluble radical polymerization initiator used, and therefore cannot be specified for all cases. Usually, the reaction temperature may be 20° C. to 110° C. or 40° C. to 90° C., from the viewpoint of promoting rapid polymerization and shortening the polymerization time, while also simplifying removal of polymerization heat and allowing a smooth reaction to take place. The polymerization time will normally be about 0.5 to 4 hours.

Polymerization of the water-soluble ethylenically unsaturated monomer as described above produces a particulate water-containing gelated polymer. In most cases, the obtained polymer (water-containing gelated polymer) may be obtained in various forms such as spherical, granular, crushed, pointed-sugar-candy-balls-shaped, or agglomerated forms thereof, but from the viewpoint of increasing the specific surface area and water-absorption rate for this embodiment, the water-containing gelated polymer may be granular, or granular with numerous protrusions on the surface.

After obtaining the water-containing gelated polymer by the first polymerization step, water-absorbent resin particles may be obtained via post-crosslinking as described below, and if necessary, an aqueous liquid containing a water-soluble ethylenically unsaturated monomer may be further added to the suspension after the first polymerization step, for further reversed-phase suspension polymerization (second polymerization step). Conducting reversed-phase suspension polymerization several times can accomplish further reduction in the residual volatile component content. After the second polymerization step, reversed-phase suspension polymerization may be repeated in the same manner. The number of times that reversed-phase suspension polymerization is repeated may be 2 or more, and may be 2 or 3 from the viewpoint of increasing productivity while reducing the residual volatile component content.

Specifically, the suspension containing the water-containing gelated polymer obtained after polymerization in the first polymerization step is cooled if necessary, for adjustment to 45° C. or higher, or 50° C. to 100° C., 55° C. to 90° C., 60° C. to 85° C. or 65° C. to 80° C. Next, the suspension containing the water-containing gelated polymer is mixed with the second aqueous liquid containing an aqueous solvent, a water-soluble ethylenically unsaturated monomer and if necessary a radical polymerization initiator, and the second aqueous liquid is dispersed dropwise. In the second polymerization step, the temperature of the suspension, when the suspension containing the water-containing gelated polymer and the total amount of the second aqueous liquid have been completely mixed, may be 35° C. or higher, 40° C. to 90° C., 45° C. to 85° C., 50° C. to 80° C. or 53° C. to 75° C. By limiting the range for the temperature of the suspension before, or before and after, the suspension containing the water-containing gelated polymer and the second aqueous liquid are mixed, it is possible to efficiently reduce the residual volatile component content of the obtained water-absorbent resin particles.

The water-soluble ethylenically unsaturated monomer and radical polymerization initiator in the second aqueous liquid may employ the same types of compounds, in amounts in the same ranges, as described above for the first aqueous liquid. The first and second aqueous liquids may comprise the same monomers and other components, or they may comprise different monomers and other components.

In the second polymerization step, the water-soluble ethylenically unsaturated monomer may be present in the second aqueous liquid in such an amount for, for example, 20-250 parts by weight, 40-200 parts by weight or 60-150 parts by weight with respect to 100 parts by weight of the water-soluble ethylenically unsaturated monomer in the first aqueous liquid. If the amount of water-soluble ethylenically unsaturated monomer used in the second aqueous liquid is at least 20 parts by weight, the residual volatile component content of the obtained water-absorbent resin particles will tend to be further reduced, and if the amount used is no greater than 250 parts by weight, it will be possible to avoid excessive increase in the particle size of the obtained water-absorbent resin particles.

From the viewpoint of increasing productivity, the concentration of the water-soluble ethylenically unsaturated monomer in the second aqueous liquid for the second polymerization step may be at least 1 wt %, 2-25 wt %, 3-20 wt % or 4-15 wt % higher than the concentration during the first polymerization step, based on the total of the aqueous solvent, the water-soluble ethylenically unsaturated monomer, the radical polymerization initiator and additives.

A water-containing gelated polymer is produced by the first polymerization step. Before the second polymerization step, there may also be provided an intermediate crosslinking step in which the water-containing gelated polymer is crosslinked. Intermediate crosslinking of the water-containing gelated polymer is accomplished, for example, by mixing the water-containing gelated polymer with the intermediate crosslinking agent specified below, and heating the mixture.

The intermediate crosslinking agent has a functional group that can react with a functional group in the water-soluble ethylenically unsaturated monomer (for example, a carboxyl group in the case of acrylic acid), and it may be a water-soluble compound. Examples of intermediate crosslinking agents include polyols such as ethylene glycol, propylene glycol, 1,4-butanediol, trimethylolpropane, glycerin, polyoxyethylene glycol, polyoxypropylene glycol and polyglycerin; compounds with two or more epoxy groups such as (poly)ethylene glycol diglycidyl ether, (poly)propylene glycol diglycidyl ether and (poly)glycerin diglycidyl ether; haloepoxy compounds such as epichlorohydrin, epibromohydrin and α-methylepichlorohydrin; compounds with two or more isocyanate groups such as 2,4-tolylene diisocyanate and hexamethylene diisocyanate; oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol and 3-butyl-3-oxetaneethanol; oxazoline compounds such as 1,2-ethylene bisoxazoline; carbonate compounds such as ethylene carbonate; and hydroxyalkylamide compounds such as bis[N, N-di(β-hydroxyethyl)]adipamide. Of these, the intermediate crosslinking agent may include a compound having in the molecule two or more functional groups that can react with functional groups of the water-soluble ethylenically unsaturated monomer. Such compounds include the polyols, compounds with two or more epoxy groups, haloepoxy compounds and compounds with two or more isocyanate groups. These may each be used alone or in combinations of two or more.

From the viewpoint of excellent reactivity, the intermediate crosslinking agent may also include a compound with two or more epoxy groups. Among compounds with two or more epoxy groups, from the viewpoint of high solubility in water and satisfactory handling ease as intermediate crosslinking agents, there may be used ethylene glycol diglycidyl ether, propylene glycol diglycidyl ether, glycerin diglycidyl ether, polyethylene glycol diglycidyl ether and polyglycerol glycidyl ether. From the viewpoint of improving various aspects of performance of the obtained water-absorbent resin particles, the compound with two or more epoxy groups may include ethylene glycol diglycidyl ether, propylene glycol diglycidyl ether, or both.

The content of the intermediate crosslinking agent may be 0.0001-0.03 mol, 0.0005-0.02 mol or 0.001-0.015 mol, with respect to 100 mol of the water-soluble ethylenically unsaturated monomer used to produce the water-containing gelated polymer. If the mixing amount of the intermediate crosslinking agent is at least 0.0001 mol, absorption of the water-soluble ethylenically unsaturated monomer in the second aqueous liquid into the water-containing gelated polymer after the intermediate crosslinking step will tend to be inhibited, and decline in the water-absorption rate and swelling performance will tend to be minimized. If the mixing amount of the intermediate crosslinking agent is no greater than 0.03 mol, decline in the water-absorption capacity of the water-absorbent resin particle by excessive crosslinking will tend to be inhibited. The reaction temperature for the intermediate crosslinking reaction may be 60° C. or higher, or between 70° C. and the boiling point temperature of the hydrocarbon dispersing medium in the first polymerization. The reaction time for the intermediate crosslinking reaction will differ depending on the reaction temperature and the type and mixing amount of the intermediate crosslinking agent, and therefore cannot be specified for all cases, but usually it may be 1-200 minutes, 5-100 minutes or 10-60 minutes.

The polymerization conducted after mixing the suspension comprising the water-containing gelated polymer obtained after polymerization by the first polymerization, and the second aqueous liquid comprising the aqueous solvent and the water-soluble ethylenically unsaturated monomer, may be carried out under the same conditions as the first polymerization. Polymerization of the water-soluble ethylenically unsaturated monomer as described above further produces a particulate water-containing gelated polymer. In most cases, the obtained polymer (water-containing gelated polymer) may be obtained in various forms such as spherical, granular, crushed, pointed-sugar-candy-balls-shaped, or agglomerated forms thereof, but from the viewpoint of increasing the specific surface area and water-absorption rate for this embodiment, the water-containing gelated polymer may be granular, or granular with numerous protrusions on the surface.

In the case that the reversed-phase suspension polymerization is carried out two or more times via the second polymerization step as described above, productivity of the water-absorbent resin particles can be increased. More surprisingly, it is possible to drastically reduce residual volatile component content in the obtained water-absorbent resin particles.

While the mechanism by which residual volatile component content is reduced by conducting a second polymerization is not fully understood, it is conjectured that, since the water-containing gelated polymer obtained by the first polymerization is present during the second polymerization, this stabilizes separation and coalescence of the aqueous liquid droplets in the W/O reversed-phase suspension system, i.e. it reduces the frequency of encapsulation of the hydrocarbon dispersing medium by the aqueous liquid droplets when the aqueous liquid droplets impact each other, and inhibits formation of an O/W/O structure.

The method for producing water-absorbent resin particles according to this embodiment may further comprise a post-crosslinking step in which the water-containing gelated polymer obtained by the final polymerization step described above is crosslinked. The method for producing water-absorbent resin particles according to this embodiment may also comprise, before the aforementioned post-crosslinking step, a primary drying step in which the weight percentage of water in the water-containing gelated polymer (water content of the water-containing gelated polymer) is adjusted to, for example, 20-130 wt %, where 100 wt % is the content of components (the polymer solid content) derived from the water-soluble ethylenically unsaturated monomer composing the water-containing gelated polymer.

There are no particular restrictions on the method of drying in the primary drying step, and for example, there may be mentioned (a) a method of externally heating the dispersion of the water-containing gelated polymer in the oily liquid (hydrocarbon dispersing medium) for reflux of the hydrocarbon dispersing medium by azeotropic distillation, to remove water, (b) a method of removing the water-containing gelated polymer by decantation and performing reduced pressure drying, and (c) a method of filtering out the water-containing gelated polymer with a filter and performing reduced pressure drying. Method (a) may be used for convenience of the production process.

If the water-containing gelated polymer prepared to a water content of 20-130 wt % is subjected to crosslinking (post-crosslinking) as described above, water-absorbent resin particles with more excellent water absorption performance will be obtained.

The post-crosslinking agent used for post-crosslinking may be one which has a functional group that can react with a functional group in the water-soluble ethylenically unsaturated monomer (for example, a carboxyl group in the case of acrylic acid), and it may be a water-soluble compound. Examples of post-crosslinking agents include polyols such as ethylene glycol, propylene glycol, 1,4-butanediol, trimethylolpropane, glycerin, polyoxyethylene glycol, polyoxypropylene glycol and polyglycerin; compounds with two or more epoxy groups such as (poly)ethylene glycol diglycidyl ether, (poly)propylene glycol diglycidyl ether and (poly)glycerin diglycidyl ether; haloepoxy compounds such as epichlorohydrin, epibromohydrin and α-methylepichlorohydrin; compounds with two or more isocyanate groups such as 2,4-tolylene diisocyanate and hexamethylene diisocyanate; oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol and 3-butyl-3-oxetaneethanol; oxazoline compounds such as 1,2-ethylene bisoxazoline; carbonate compounds such as ethylene carbonate; and hydroxyalkylamide compounds such as bis[N,N-di(β-hydroxyethyl)]adipamide. Of these, the post-crosslinking agent may include a compound having in the molecule two or more functional groups that can react with functional groups of the water-soluble ethylenically unsaturated monomer. Such compounds include the polyols, compounds with two or more epoxy groups, haloepoxy compounds and compounds with two or more isocyanate groups. These may each be used alone or in combinations of two or more.

From the viewpoint of excellent reactivity, the post-crosslinking agent may also include a compound with two or more epoxy groups. From the viewpoint of high solubility in water and satisfactory handling ease as a post-crosslinking agent, compounds with two or more epoxy groups may include ethylene glycol diglycidyl ether, propylene glycol diglycidyl ether, glycerin diglycidyl ether, polyethylene glycol diglycidyl ether and polyglycerol glycidyl ether. From the viewpoint of improving various aspects of performance of the obtained water-absorbent resin particles, the compound with two or more epoxy groups may include ethylene glycol diglycidyl ether, propylene glycol diglycidyl ether, or both.

The content of the post-crosslinking agent may be 0.0001-1 mol, 0.0005-0.5 mol, 0.001-0.1 mol or 0.005-0.05 mol, with respect to 100 mol of the water-soluble ethylenically unsaturated monomer used to produce the water-containing gelated polymer. If the post-crosslinking agent content is at least 0.0001 mol, a crosslinking effect will be exhibited, and the water-absorption rate of the water-absorbent resin particles will tend to be further improved without the water-absorbent resin particle surfaces becoming viscous upon absorption of water, while if it is no greater than 1 mol, the crosslinking will not be excessive, and water-absorption capacity of the water-absorbent resin particles will tend to be further increased.

Mixture of the water-containing gelated polymer and the post-crosslinking agent can be accomplished after adjusting the water content of the water-containing gelated polymer to a specific range (primary drying step). By thus controlling the water content of the water-containing gelated polymer at the time of mixture of the water-containing gelated polymer and the post-crosslinking agent, it is possible to more favorably promote the post-crosslinking reaction.

The water content of the water-containing gelated polymer in the post-crosslinking step may be 20-130 wt %, 25-110 wt %, 30-90 wt %, 35-80 wt % or 40-70 wt %. If the water content of the water-containing gelated polymer is within the aforementioned range, it will be possible to shorten the primary drying step and increase the production efficiency while further improving the water absorption performance by the post-crosslinking reaction.

The water content of the water-containing gelated polymer can be determined by: calculating the amount of water in the water-containing gelated polymer by adding the amount of water used as necessary when mixing the intermediate crosslinking agent or the post-crosslinking agent to the value (the amount of the water in the primary drying gel) obtained by subtracting the externally extracted amount of water by the primary drying step from the amount of water in the aqueous liquid before polymerization in the entire polymerization step; then calculating the proportion of the amount of water in the water-containing gelated polymer with respect to the weight of components derived from the water-soluble ethylenically unsaturated monomer composing the water-containing gelated polymer.

The weight of the components derived from the water-soluble ethylenically unsaturated monomer composing the water-containing gelated polymer is determined by calculation as the theoretical polymer solid fraction, from the total weight of the water-soluble ethylenically unsaturated monomer used for polymerization reaction.

During mixing the water-containing gelated polymer and post-crosslinking agent, water or a hydrophilic solvent may be added as a solvent to dissolve the post-crosslinking agent, to uniformly disperse the post-crosslinking agent. Examples of hydrophilic solvents include lower alcohols such as methyl alcohol, ethyl alcohol and isopropyl alcohol, ketones such as acetone and methyl ethyl ketone, ethers such as dioxane and tetrahydrofuran, amides such as N,N-dimethylformamide, and sulfoxides such as dimethyl sulfoxide. These solvents may each be used alone, or two or more may be used in combination as necessary.

The weight ratio of the amount of water in the primary drying gel and the amount of solvent to be added may be 100:0-60:40, 99:1-70:30, 98:2-80:20 or 98:2-90:10, from the viewpoint of reasonably shortening the drying step for increased economy of the process, while uniformly dispersing the post-crosslinking agent.

The reaction temperature of the post-crosslinking reaction may be 60° C. or higher, 70° C. to 200° C. or 80° C. to 150° C. A reaction temperature of 60° C. or higher will tend to promote the post-crosslinking reaction and eliminate the need for extra time for the reaction, while a reaction temperature of no higher than 200° C. will tend to inhibit deterioration of the obtained water-absorbent resin particles and decline in the water absorption performance.

The reaction time for the post-crosslinking reaction will differ depending on the reaction temperature and the type and mixing amount of the post-crosslinking agent, and therefore cannot be specified for all cases, but usually it may be 1-300 minutes, or 5-200 minutes.

The method for producing water-absorbent resin particles according to this embodiment may comprise a secondary drying step, after the post-crosslinking reaction, in which energy such as heat is externally applied to remove the water and hydrocarbon dispersing medium by distillation. Such secondary drying will tend to yield water-absorbent resin particles with an excellent flowability.

There are no particular restrictions on the method for secondary drying, and for example, there may be mentioned (a) a method of distilling a mixture of the resin particles after post-crosslinking reaction, dispersed in the oily liquid (hydrocarbon dispersing medium), to simultaneously remove the water and hydrocarbon dispersing medium, (b) a method of removing the resin particles by decantation and performing reduced pressure drying, and (c) a method of filtering out the resin particles with a filter and performing reduced pressure drying. Among these, method (a) may be used for convenience of the production steps.

The production method according to the present embodiment can yield water-absorbent resin particles according to the embodiment described below. The water-absorbent resin particles have suitable particle size, excellent water-absorption rate, and low residual volatile component content.

The median particle size of the water-absorbent resin particles may be 100-600 μm. With such a median particle size, it will be possible to keep satisfactory handling ease during production of the absorbent, and to design a thin absorbent. The median particle size may be 110-500 μm, 120-400 μm or 130-350 μm. The median particle size is measured by the method described below for the examples.

The water-absorption rate of the water-absorbent resin particle for physiological saline may be 1-20 seconds. If the water-absorbent resin particles have such an excellent water-absorption rate, it will be possible to prevent fluid leakage when the water-absorbent resin particles are used in an absorbent article, water blocking material or the like. The water-absorption rate may be 1-15 seconds, 2-10 seconds, 2-8 seconds or 2-6 seconds. The water-absorption rate is measured by the method described below for the examples.

The residual volatile component content in the water-absorbent resin particles may be no greater than 1.5 wt %. If the water-absorbent resin particles have such a low residual volatile component content, it will be possible to inhibit generation of odor when the water-absorbent resin particles have absorbed water, thereby improving comfort for wearers of the absorbent article. The residual volatile component content may be no greater than 1.3 wt %, 0.001-1.2 wt %, 0.01-1.0 wt %, or 0.1-0.6 wt %.

There are no particular restrictions on the water-absorption capacity of physiological saline of the water-absorbent resin particles, but it can be made larger from the viewpoint of increasing the absorption capacity of the absorbent article. The water-absorption capacity of physiological saline of the water-absorbent resin particle may be 30-90 g/g, 35-80 g/g, 45-75 g/g, 50-70 g/g, or 55-65 g/g. The water-absorption capacity of physiological saline is measured by the method described below for the examples.

Water-absorbent resin particles obtained by the method for producing water-absorbent resin particles according to the present embodiment may contain additives such as a heat-resistant stabilizer, antioxidant, anti-bacterial agent or the like, depending on the purpose. The amount of such additives will differ depending on the purpose of use of the water-absorbent resin particles, the types of additives, and other factors, but it may be 0.001-10 parts by weight, 0.01-5 parts by weight or 0.1-2 parts by weight with respect to 100 parts by weight of the water-absorbent resin particles.

EXAMPLES

The invention will now be explained in more detail by the following examples, with the understanding that the invention is not restricted only to these examples.

Example 1

There was prepared a round-bottom cylindrical separable flask (hereunder referred to as "round bottom flask") with an inner diameter of 100 mm, equipped with a reflux condenser, dropping funnel, nitrogen gas inlet tube, and a stirring blade with 4 slanted paddle blades (fluorine resin-coated surfaces) with 50 mm blade diameters, in two levels. After adding 660 mL of n-heptane as a hydrocarbon dispersing medium into the round bottom flask, 1.10 g of sorbitan monolaurate (trade name: NONION LP-20R by NOF Corp., HLB: 8.6) was added as a surfactant, the mixture was heated to 70° C., and the surfactant was dissolved in the n-heptane to prepare an oily liquid.

Separately, in a 300 mL-internal volume beaker there was added 92 g (1.03 mol) of an 80.5 wt % acrylic acid aqueous solution as a water-soluble ethylenically unsaturated monomer. The acrylic acid aqueous solution was cooled in ice water while adding 147.7 g of a 20.9 wt % sodium hydroxide aqueous solution dropwise to the beaker, for neutralization of 75 mol % of the acrylic acid. Next, 0.10 g (0.00037 mol) of potassium persulfate was added as a water-soluble radical polymerization initiator to the beaker and dissolved to prepare an aqueous liquid. The polymer solid content of the aqueous liquid was 91 g, and the amount of water was 148.6 g.

The rotational speed of the stirrer was 700 rpm, and the total amount of the aqueous liquid was added to the oily liquid in the round bottom flask at 70° C. The temperature of the suspended mixture (suspension) upon completion of the addition was 47° C. After exchanging the internal system with nitrogen for 30 minutes while maintaining the same temperature, the round bottom flask was immersed in a water bath at 70° C. to raise the temperature, and polymerization reaction was conducted for 1 hour to obtain a water-containing gelated polymer.

Next, an oil bath at 120° C. was used to raise the temperature of the system, and the water and n-heptane were azeotropically distilled to remove 111.7 g of water out of the system under reflux of the n-heptane (primary drying step). Next, 4.14 g (0.00048 mol) of a 2 wt % ethylene glycol diglycidyl ether aqueous solution was added as a post-crosslinking agent to the round bottom flask, to obtain a mixture comprising the post-crosslinking agent. The amount of water in the round bottom flask at this time was 40.9 g, and the amount of water in the water-containing gelated polymer after the primary drying (post-crosslinking) was 45 wt %. After preparing the mixture comprising the post-crosslinking agent, it was kept at approximately 80° C. for 2 hours for further crosslinking of the water-containing gelated polymer (post-crosslinking step).

The n-heptane was then distilled off at 120° C. for drying (secondary drying step) to obtain 88.2 g of granular water-absorbent resin particles.

Example 2

An oily liquid was prepared with the same composition as Example 1, with increase of the temperature in the round bottom flask to 75° C. to dissolve the surfactant in the n-heptane. The total amount of the aqueous liquid was added to the oily liquid kept at 75° C., and the temperature of the suspended mixture upon completion of the addition was 55° C. The procedure was otherwise carried out as in Example 1, to obtain 89.1 g of granular water-absorbent resin particles.

Example 3

There was prepared a round-bottom cylindrical separable flask (hereunder referred to as "round bottom flask") with an inner diameter of 100 mm, equipped with a reflux condenser, dropping funnel, nitrogen gas inlet tube, and a stirring blade (fluorine resin-coated surfaces) with 4 slanted paddle blades with 50 mm blade diameters, in two levels. After adding 530 mL of n-heptane as a hydrocarbon dispersing medium into the round bottom flask, 1.65 g of sorbitan monolaurate (trade name: NONION LP-20R by NOF Corp., HLB: 8.6) was added as a surfactant, the mixture was heated to 72° C., and the surfactant was dissolved in the n-heptane to prepare an oily liquid.

Separately, in a 300 mL-internal volume beaker there was added 92 g (1.03 mol) of an 80.5 wt % acrylic acid aqueous solution as a water-soluble ethylenically unsaturated monomer. The acrylic acid aqueous solution was cooled in ice water while adding 147.6 g of a 20.9 wt % sodium hydroxide aqueous solution dropwise to the beaker, for neutralization of 75 mol % of the acrylic acid. Next, 0.10 g (0.00037 mol) of potassium persulfate was added as a water-soluble radical polymerization initiator to the beaker and dissolved to prepare a first aqueous liquid. The polymer solid content of the first aqueous liquid was 91.0 g, and the amount of water was 148.5 g.

The rotational speed of the stirrer was 500 rpm, and the total amount of the first aqueous liquid was added to the oily liquid in the round bottom flask at 72° C. The temperature of the suspended mixture upon completion of the addition was 51° C. After exchanging the internal system with nitrogen gas for 30 minutes at the same temperature, the round bottom flask was immersed in a water bath at 70° C. to raise the temperature, and polymerization reaction was conducted for 1 hour to obtain a water-containing gelated polymer (first polymerization step). After polymerization, 1.24 g (0.00014 mol) of a 2 wt % ethylene glycol diglycidyl ether aqueous solution was added as an intermediate crosslinking agent and crosslinking reaction was conducted at 75° C. for 30 minutes (intermediate crosslinking step).

Next, in a 300 mL beaker separate from the first polymerization step there was added 92 g (1.03 mol) of an 80.5 wt % acrylic acid aqueous solution as a water-soluble ethylenically unsaturated monomer. The acrylic acid aqueous liquid was cooled in ice water while adding 114.7 g of a 26.9 wt % sodium hydroxide aqueous solution dropwise to the beaker, for neutralization of 75 mol % of the acrylic acid. Next, 0.10 g (0.00037 mol) of potassium persulfate was added as a water-soluble radical polymerization initiator to the beaker and dissolved to prepare a second aqueous liquid. The polymer solid content of the second aqueous liquid was 91.0 g, and the amount of water was 115.9 g.

The suspension after completion of the crosslinking reaction by the intermediate crosslinking agent was cooled to 70° C. while stirring with a stirrer rotational speed set to 1000 rpm. The total amount of the second aqueous liquid was added dropwise into the cooled round bottom flask. The temperature of the suspension upon completion of the dropwise addition was 55° C., and the internal system was subsequently exchanged with nitrogen gas for 30 minutes while maintaining the same temperature in the system. The round bottom flask was immersed in a water bath at 70° C. to raise the temperature, and then polymerization reaction was conducted for 1 hour (second polymerization step) to obtain a water-containing gelated polymer.

The round bottom flask was immersed in an oil bath at 120° C. to raise the temperature of the suspension comprising the water-containing gelated polymer obtained in the second polymerization step, and the water and n-heptane were azeotropically distilled to remove 208.6 g of water out of the system under reflux of n-heptane (primary drying step). Next, 8.28 g (0.00095 mol) of a 2 wt % ethylene glycol diglycidyl ether aqueous solution was added as a post-crosslinking agent to the round bottom flask, to obtain a mixture comprising the post-crosslinking agent. The water content in the round bottom flask at this time was 63.9 g, and the amount of water in the water-containing gelated polymer after the primary drying (post-crosslinking) was 35 wt %. After preparing the mixture comprising the post-crosslinking agent, it was kept at approximately 80° C. for 2 hours (post-crosslinking step).

The n-heptane was then distilled off at 120° C. for drying (secondary drying step) to obtain 191.1 g of granular water-absorbent resin particles.

Comparative Example 1

There was prepared a round-bottom cylindrical separable flask (hereunder referred to as "round bottom flask") with an inner diameter of 100 mm, equipped with a reflux condenser, dropping funnel, nitrogen gas inlet tube, and a stirring blade (fluorine resin-coated surface) with four slanted paddle blades with 50 mm blade diameters, in two levels. After adding 660 mL of n-heptane as a hydrocarbon dispersing medium into the round bottom flask, 1.10 g of sorbitan monolaurate (trade name: NONION LP-20R by NOF Corp., HLB: 8.6) was added as a surfactant, the mixture was heated to 45° C., and the surfactant was dissolved in the n-heptane to prepare an oily liquid.

Separately, 92 g (1.03 mol) of an 80.5 wt % acrylic acid aqueous solution was added as a water-soluble ethylenically unsaturated monomer to a beaker with an internal volume of 300 mL, and the acrylic acid aqueous solution was cooled in ice water while adding 147.7 g of a 20.9 wt % sodium hydroxide aqueous solution dropwise to the beaker, for neutralization of 75 mol % of the acrylic acid. Next, 0.10 g (0.00037 mol) of potassium persulfate was added as a water-soluble radical polymerization initiator to the beaker and dissolved to prepare an aqueous liquid. The polymer solid content of the aqueous liquid was 91 g, and the amount of water was 148.6 g.

The rotational speed of the stirrer was 700 rpm, and the total amount of the aqueous liquid was added to the oily liquid in the round bottom flask at 45° C. The temperature of the suspension upon completion of the addition was 33° C. After exchanging the internal system with nitrogen for 30 minutes, the round bottom flask was immersed in a water bath at 70° C. to raise the temperature, and polymerization reaction was conducted for 1 hour to obtain a water-containing gelated polymer.

Next, an oil bath at 120° C. was used to raise the temperature in the system, and the water and n-heptane were azeotropically distilled to remove 127.6 g of water out of the system under reflux of the n-heptane (primary drying step). Next, 5.52 g (0.00063 mol) of a 2 wt % ethylene glycol diglycidyl ether aqueous solution was added as a post-crosslinking agent to the round bottom flask, to obtain a mixture comprising the post-crosslinking agent. The amount of water in the round bottom flask at this time was 26.3 g, and the amount of water in the water-containing gelated polymer after the primary drying (post-crosslinking) was 29 wt %. After preparing the mixture comprising the post-crosslinking agent, it was kept at approximately 80° C. for 2 hours (post-crosslinking step).

The n-heptane was then distilled off at 120° C. for drying (secondary drying step) to obtain 87.4 g of granular water-absorbent resin particles.

Comparative Example 2

After adding 92 g (1.02 mol) of an 80 wt % acrylic acid aqueous solution as a water-soluble ethylenically unsaturated monomer to an Erlenmeyer flask with an internal volume of 500 mL, the acrylic acid was cooled in ice water and stirred while adding 146.0 g of a 21 wt % sodium hydroxide aqueous solution dropwise to the Erlenmeyer flask, for neutralization of 75 mol % of the acrylic acid, to prepare an acrylic acid partial neutralized salt solution with a monomer concentration of 38 wt %. To the obtained acrylic acid partial neutralized salt solution there were added 18.4 mg (106 micromoles) of ethylene glycol diglycidyl ether as an internal crosslinking agent and 92 mg of potassium persulfate as a radical polymerization initiator, to prepare a first aqueous liquid.

To a 5-necked cylindrical round bottom flask with an internal volume of 2 L, equipped with a stirrer having a 2-level paddle blade, a thermometer, a reflux condenser, a dropping funnel and a nitrogen gas inlet tube (hereunder referred to as "round bottom flask"), there were added 340 g (500 mL) of n-heptane as a hydrocarbon dispersing medium and 0.92 g of a sucrose fatty acid ester (trade name: S-370 by Mitsubishi-Kagaku Foods Corp., HLB value: 3.0) as a surfactant, and after heating to dissolution in the n-heptane, the internal temperature was adjusted to 50° C. to obtain an oily liquid. The total amount of the first aqueous liquid was added to this oily liquid, the mixture was suspended while maintaining a temperature of 50° C. and stirring, and after thorough nitrogen-exchange of the internal system, a water bath at 70° C. was used for 2 hours of polymerization reaction (first polymerization step).

After adding 92 g (1.02 mol) of an 80 wt % acrylic acid aqueous solution as a water-soluble ethylenically unsaturated monomer to a separate Erlenmeyer flask with an internal volume of 500 mL, the acrylic acid aqueous solution was externally cooled with ice water and stirred while adding 146.0 g of a 21 wt % sodium hydroxide aqueous solution dropwise to the Erlenmeyer flask, for neutralization of 75 mol % of the acrylic acid, to prepare an acrylic acid partial neutralized salt solution with a monomer concentration of 38 wt %. To the obtained acrylic acid partial neutralized salt solution there were added 18.4 mg (106 micromoles) of ethylene glycol diglycidyl ether as an internal crosslinking agent and 92 mg of potassium persulfate as a radical polymerization initiator, to prepare a second aqueous liquid.

After completion of the first polymerization step, the suspension was cooled to 50° C. while stirring, and the total amount of the second aqueous liquid was added dropwise to a cooled flask with the surfactant in the dissolved state. The internal system was subsequently exchanged with nitrogen gas for 30 minutes while maintaining a temperature of 50° C. and stirring. The round bottom flask was immersed in a water bath at 70° C. to raise the temperature, and then polymerization reaction was conducted for 1.5 hours (second polymerization step) to obtain a water-containing gelated polymer.

The round bottom flask was immersed in an oil bath at 120° C. to raise the temperature of the suspension comprising the water-containing gelated polymer obtained in the second polymerization step, and the water and n-heptane were azeotropically distilled to remove 250 g of water out of the system under reflux of n-heptane (primary drying step). Next, 110 mg (0.00063 mol) of an ethylene glycol diglycidyl ether aqueous solution was added as a post-crosslinking agent to the round bottom flask, to obtain a mixture comprising the post-crosslinking agent. The amount of water in the water-containing gelated polymer at this time was 25 wt %. After preparing the mixture comprising the post-crosslinking agent, it was kept at approximately 80° C. for 2 hours (post-crosslinking step).

The n-heptane was then distilled off at 120° C. for drying (secondary drying step) to obtain 188.3 g of spherical water-absorbent resin particles.

<Evaluation>

The water-absorbent resin particles obtained in the examples and comparative examples were evaluated in the following manner. The evaluation results are shown in Table 2.

(1) Residual Volatile Component Content (a) Calibration Curve Plot

The hydrocarbon dispersing media used in the examples and comparative examples, dimethylformamide (DMF) and a 25 wt % phosphoric acid aqueous solution were prepared in a sealable glass container. In order to minimize error due to volatilization during the measurement, these were cooled for use where necessary.

First, 0.15 g of the hydrocarbon dispersing medium was precisely weighed out into a graduated flask with a 200 mL internal volume, and then DMF was added to a total of 200 mL, to prepare standard solution 1. Next, standard solution 1 was precisely measured out to 10 mL with a whole pipette into a graduated flask with a 20 mL internal volume, and DMF was added to a total of 20 mL, for half-dilution of standard solution 1 to prepare standard solution 2.

In the same manner, standard solution 2 was half-diluted to obtain standard solution 3, standard solution 3 was half-diluted to obtain standard solution 4, and standard solution 4 was half-diluted to obtain standard solution 5.

Standard solution 1 was added in an amount of 4 mL to a vial with a 20 mL internal volume (VZH-20CR-100, product of SMI-Lab Ltd.), and then 5 mL of a 25 wt % phosphoric acid aqueous solution was further added. Septum rubber and an aluminum cap were used to rapidly seal the vial, and the vial was shaken for 1 minute for mixing. The same procedure was carried out for standard solutions 2 to 5, to prepare calibration curve solutions.

After shaking and stirring of the vial while heating at 110° C. for 2 hours, 1 mL of the gas phase portion was injected into a gas chromatograph, and a chromatogram was obtained for each calibration curve solution. A calibration curve was plotted using the mass of the hydrocarbon dispersing medium that had been precisely weighed out when preparing the calibration curve solution, and the peak area of the chromatogram. When more than one peak was observed for the hydrocarbon dispersing medium, the peak areas were summed to plot the calibration curve.

(b) Measurement of Residual Volatile Component Content

DMF and a 25 wt % phosphoric acid aqueous solution were prepared. A 0.10 g portion of each of the water-absorbent resin particles obtained in the examples and comparative examples was weighed out into a vial with a 20 mL internal volume. To the vial there were added 4 mL of the DMF and 5 mL of the 25 wt % phosphoric acid aqueous solution. Septum rubber and an aluminum cap were used to rapidly seal the vial, and the vial was shaken for 1 minute for mixing. After shaking and mixing of the vial while heating at 110° C. for 2 hours, 1 mL of the gas phase portion was injected into a gas chromatograph, and a chromatogram was obtained.

Based on the peak area of the obtained chromatogram and the plotted calibration curve, the amount of hydrocarbon dispersing medium in the water-absorbent resin particles (precisely weighed 0.10 g portion) was calculated, and the value per 1 g of water-absorbent resin particles was recorded as the residual volatile component content (wt %).

The following conditions were used for the gas chromatography.

Apparatus: GC-2014 (Shimadzu Corp.)
Headspace autosampler: HT200H (Hamilton Company)
Filler: Squalane 25% Shimalite (NAW)(101)
80-100 mesh
Column: 3.2 mm$\phi$×2.1 m
Column temperature: 80° C.
Inlet temperature: 180° C.
Detector temperature: 180° C.
Detector: FID
Carrier gas: $N_2$
Vial heating temperature: 110° C.
Syringe preset temperature: 130° C.

(2) Odor Sensory Test (6-Level Odor Intensity Indication Method)

The odor derived from the hydrocarbon dispersing medium upon swelling of the water-absorbent resin particles was evaluated by the following method. After adding 20.0 g of 0.9 wt % saline solution at 25° C. to a sealable glass bottle with an internal volume of 140 mL (mayonnaise bottle), a stirring bar with a length of 3 cm was added and the contents were stirred. A 2.0 g portion of water-absorbent resin particles was added to the glass bottle, and it was sealed. The odor of the hydrocarbon dispersing medium in the glass bottle was judged by 5 analysts based on the evaluation criteria listed in Table 1, and the average value was recorded as the odor evaluation results.

TABLE 1

| 6-Level criteria | Evaluation |
| --- | --- |
| 5 | Intense odor |
| 4 | Strong odor |
| 3 | Easily perceivable odor |
| 2 | Identifiable but weak order |
| 1 | Barely perceivable odor |
| 0 | Odorless |

(3) Water-Absorption Capacity Of Physiological Saline (G/G)

The absorption of physiological saline was evaluated by the following method. After mixing 500 g of 0.9 wt % saline solution and 2.0 g of water-absorbent resin particles, the mixture was stirred at room temperature for 60 minutes. A JIS Z 8801-1 standard sieve, with a weight of Wa (g) and a mesh size of 75 μm, was used to filter the liquid mixture. The filtered product was allowed to stand on the sieve for 30 minutes, with the sieve tilted at an inclination angle of about 30 degrees with respect to the horizontal. The total weight of the water-absorbent resin particles after absorbing and the sieve Wb (g) was measured, and the water-absorption capacity was calculated by the following formula.

Water-absorption capacity of physiological saline=(Wb−Wa)/2.0

(4) Water-Absorption Rate of Physiological Saline (Sec)

Measurement of the water-absorption rate was conducted in a room controlled to 25° C.±1° C. A 50±0.1 g portion of physiological saline pre-adjusted to a temperature of 25±0.2° C. by a thermobath was stirred with a magnetic stirrer bar (8 mm$\phi$×30 mm, ringless) to generate a vortex, at a rotational speed of 600 rpm. A 2.0±0.002 g portion of water-absorbent resin particles was added at once to the physiological saline, and the time from addition of the water-absorbent resin particles until convergence of the vortex on the liquid surface (sec) was measured and recorded as the water-absorption rate of the water-absorbent resin particles.

(5) Median Particle Size

With 100 g of water-absorbent resin particles there was mixed 0.5 g of amorphous silica (trade name: Sipernat 200, product of Degussa Japan) as a lubricant. The water-absorbent resin particles were passed through a JIS Z 8801-1 standard sieve with a mesh size of 250 μm, and the median Poor: High dusting. Low flowability, hampering procedures for dosaging and cleaning.

The evaluation results and the polymerization conditions in each of the examples and comparative examples are summarized in Table 2. In the table, the temperature "upon suspension" in the first polymerization step and second polymerization step is the temperature of the reaction mixture upon addition of the total amount of the monomer aqueous liquid.

TABLE 2

| | | Suspension temperature | | | | | | | | |
|---|---|---|---|---|---|---|---|---|---|---|
| | | First polymerization step | | Second polymerization step | | Residual | | | | |
| | Surfactant HLB | Before monomer addition °C. | Upon suspension °C. | Before monomer addition °C. | Upon suspension °C. | volatile component content wt % | Odor | Water-absorption capacity g/g | Absorption rate sec | Median particle size μm | Handling ease Visual |
| Example 1 | 8.6 | 70 | 47 | — | — | 1.48 | 2.6 | 62 | 2 | 130 | Good |
| Example 2 | 8.6 | 75 | 55 | — | — | 1.28 | 2.4 | 61 | 2 | 130 | Good |
| Example 3 | 8.6 | 72 | 51 | 70 | 55 | 0.58 | 1.4 | 65 | 3 | 160 | Good |
| Comp. Example 1 | 8.6 | 45 | 33 | — | — | 1.85 | 3.2 | 71 | 3 | 130 | Good |
| Comp. Example 2 | 3 | 50 | 50 | 50 | 50 | 0.80 | 1.8 | 64 | 7 | 60 | Poor | particle size was measured using sieve combination (A) below when the amount remaining on the sieve was at least 50 wt % of the total, or using sieve combination (B) below when it was less than 50 wt %.

(A) JIS standard sieves were combined in the following order from the top: a sieve with a mesh size of 850 μm, a sieve with a mesh size of 600 μm, a sieve with a mesh size of 500 μm, a sieve with a mesh size of 425 μm, a sieve with a mesh size of 300 μm, a sieve with a mesh size of 250 μm, a sieve with a mesh size of 150 μm and a pan.

(B) JIS standard sieves were combined in the following order from the top: a sieve with a mesh size of 425 μm, a sieve with a mesh size of 250 μm, a sieve with a mesh size of 180 μm, a sieve with a mesh size of 150 μm, a sieve with a mesh size of 106 μm, a sieve with a mesh size of 75 μm, a sieve with a mesh size of 45 μm and a pan.

The water-absorbent resin particles were placed on the uppermost sieve of the combination, and classified by shaking for 20 minutes using a Ro-Tap shaker.

After classifying, the weight of the water-absorbent resin particles remaining on each sieve was calculated as a percentage of the total weight, and by integrating in order from the largest particle size, the relationship between sieve opening and the integrated value for the percentage of water-absorbent resin particles remaining on the sieve was plotted on logarithmic probability paper. By connecting the plots on the probability paper with a straight line, the particle size corresponding to 50 wt % integrated weight percentage was determined as the median particle size.

(6) Handling Ease

The powder handling ease of the water-absorbent resin particles was visually evaluated by 5 analysts, on the following criteria. The evaluation selected by at least 3 analysts was recorded as the powder handling ease of the water-absorbent resin particles.

Good: Low dusting. Suitable flowability, facilitating procedures for dosaging and cleaning.

As seen in Table 2, the water-absorbent resin particles obtained in Examples 1 to 3 all exhibited excellent water absorption performance including water-absorption rate, while also having suitable particle size, and also had low residual volatile component content. On the other hand, the water-absorbent resin particles obtained in the comparative examples were inadequate in terms of these performances.

INDUSTRIAL APPLICABILITY

Water-absorbent resin particles obtained by the production method of this embodiment may be suitably used in a variety of fields, including hygiene materials such as paper diapers, sanitary products and pet sheets, water-retaining material, agricultural and gardening materials such as soil conditioners, water blocking materials for electric power and communication cables, and industrial materials such as condensation-proof materials, and they may be most suitably used in fields including special hygiene materials such as adult diapers, incontinence pads, toilet-training pants and extra-high-absorbent napkins, water blocking materials for cables, pet sheets, portable toilets, and the like.

The invention claimed is:

1. A method for producing water-absorbent resin particles comprising, in order,
   a first polymerization step that includes mixing an oily liquid comprising a hydrocarbon dispersing medium and a surfactant, and a first aqueous liquid comprising an aqueous solvent and a water-soluble ethylenically unsaturated monomer, forming a suspension comprising the oily liquid and the aqueous liquid dispersed in the oily liquid, and polymerizing the water-soluble ethylenically unsaturated monomer in the suspension to obtain a suspension comprising a water-containing gelated polymer, and
   a second polymerization step that includes mixing the suspension at 45° C. or higher comprising the water-containing gelated polymer, and a second aqueous liquid comprising an aqueous solvent and a water-soluble ethylenically unsaturated monomer, and polymerizing the water-soluble ethylenically unsaturated monomer in the suspension in which the second aqueous liquid has been dispersed, wherein the surfactant has an HLB of 6 or greater, and the temperature of the suspension is at 45° C. or higher at initial mixing of the oily liquid and the first aqueous liquid, the temperature of the suspension is from 45° C. to 55° C. at the time point at which mixing of the entire amounts of the oily liquid and the first aqueous liquid has been completed, and the temperature of the suspension is not below 45° C. between the initial mixing and the completion of the mixing of the entire amounts of the oily liquid and the first aqueous liquid.

2. The method for producing water-absorbent resin particles according to claim 1, wherein the temperature of the oily liquid that is to be mixed with the aqueous liquid is 50° C. or higher.

3. The method for producing water-absorbent resin particles according to claim 1, wherein the surfactant includes at least one compound selected from the group consisting of sorbitan fatty acid esters, polyglycerin fatty acid esters and sucrose fatty acid esters.

4. The method for producing water-absorbent resin particles according to claim 1, wherein the water-soluble ethylenically unsaturated monomer of the first and the second polymerization step includes at least one compound selected from the group consisting of acrylic acid and its salts, methacrylic acid and its salts, and acrylamide.

5. The method for producing water-absorbent resin particles according to claim 1, wherein the hydrocarbon dispersing medium includes at least one dispersing medium selected from the group consisting of C6-8 aliphatic hydrocarbons and C6-8 alicyclic hydrocarbons.

* * * * *